(12) United States Patent
Scheibner et al.

(10) Patent No.: US 9,127,995 B2
(45) Date of Patent: Sep. 8, 2015

(54) FORCE TRANSDUCER FORMING A LOAD CELL

(75) Inventors: Dirk Scheibner, Nürnberg (DE); Arno Steckenborn, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 102 days.

(21) Appl. No.: 14/118,179

(22) PCT Filed: May 11, 2012

(86) PCT No.: PCT/EP2012/058729
§ 371 (c)(1),
(2), (4) Date: Nov. 15, 2013

(87) PCT Pub. No.: WO2012/156290
PCT Pub. Date: Nov. 22, 2012

(65) Prior Publication Data
US 2014/0102218 A1  Apr. 17, 2014

(30) Foreign Application Priority Data
May 17, 2011  (DE) .......................... 10 2011 076 006

(51) Int. Cl.
*G01L 1/08*  (2006.01)
*G01G 3/12*  (2006.01)
*G01G 3/14*  (2006.01)

(52) U.S. Cl.
CPC  *G01L 1/086* (2013.01); *G01G 3/12* (2013.01); *G01G 3/1416* (2013.01)

(58) Field of Classification Search
CPC .......... G01G 3/12; G01G 3/1416; G01L 1/086
USPC .......... 73/862.61, 862.621, 862.629, 862.632, 73/862.637
See application file for complete search history.

(56) References Cited

U.S. PATENT DOCUMENTS

| | | | |
|---|---|---|---|
| 4,754,823 A | 7/1988 | Baumann | |
| 4,811,004 A * | 3/1989 | Person et al. | 345/175 |
| 6,491,647 B1 * | 12/2002 | Bridger et al. | 600/585 |
| 6,705,166 B2 | 3/2004 | Leonardson | |
| 7,020,972 B2 * | 4/2006 | Graf et al. | 33/501.7 |
| 2004/0083825 A1 | 5/2004 | Tsutaya | |
| 2008/0196503 A1 * | 8/2008 | Makuth et al. | 73/579 |
| 2009/0183571 A1 * | 7/2009 | Mochida | 73/514.33 |
| 2010/0068910 A1 | 3/2010 | Klinger et al. | |
| 2014/0123772 A1 * | 5/2014 | Amtmann et al. | 73/862.626 |

FOREIGN PATENT DOCUMENTS

| | | |
|---|---|---|
| CN | 2866583 | 2/2007 |
| CN | 101553957 | 10/2009 |
| CN | 101995078 | 3/2011 |

(Continued)

*Primary Examiner* — Max Noori
(74) *Attorney, Agent, or Firm* — Cozen O'Connor

(57) ABSTRACT

A force transducer, in particular a weighing cell, includes a spring body, which deforms under the action of a force or load to be measured, and a sensor that includes two separate sensor parts mounted at different locations of the spring body and that generates a sensor signal which is dependent on the relative position of the sensor parts with respect to each other. In order to improve the adaptation of the sensor to the spring body, one of the sensor parts is attached to the spring body with interposition of an electromechanical actuator and a control device is present, which controls the actuator dependent on the sensor signal in the direction of a reduction in the positional difference of the sensor parts.

10 Claims, 3 Drawing Sheets

(56) References Cited

FOREIGN PATENT DOCUMENTS

| DE | 3716651 | | 12/1987 |
|---|---|---|---|
| DE | 3716615 | C2 | 5/1996 |
| DE | 19713567 | A1 | 6/1998 |
| DE | 102008019115 | A1 | 10/2009 |
| EP | 0534270 | A1 | 3/1993 |
| WO | WO 02103369 | A1 | 12/2002 |

* cited by examiner

FORCE TRANSDUCER FORMING A LOAD CELL

REFERENCE TO RELATED APPLICATIONS

This is a U.S. national stage of application No. PCT/EP2012/058729 filed 11 May 2012 . Priority is claimed on German Application No. 10 2011 076 006.7 filed 17 May 2011, the content of which is incorporated herein by reference in its entirety.

BACKGROUND OF THE INVENTION

1. Field of the Invention

The invention relates to a force transducer and, more particularly, to a load cell having a spring body that deforms under action of a force or load to be measured, and a sensor including two separate sensor parts attached at different locations of the spring body and that generates a sensor signal dependent on the position of the sensor parts relative to one another.

2. Description of the Invention

In general, force transducers and load cells in particular are measuring transducers that convert a force or load acting on them into an electrical analog or digital measurement signal. In this case, a usually metal spring body is elastically deformed in a manner proportional to the applied load or force and the resultant deformation of the spring body or of particular parts of the spring is detected using suitable sensors. Changes in length on bent parts are usually detected using strain gages. Alternatively, changes in distance resulting from the deformation may be capacitively detected. The sensor means, such as strain gages or capacitor surfaces, are directly attached to the spring body.

EP 0 534 270 A1 or DE 10 2008 019 115 A1 disclose a force transducer or a load cell having a capacitive. The capacitive sensor has two electrodes (i.e., capacitor plates) that engage in one another in a comb-like manner and are attached to different parts of the spring body. The load cell operates according to the deflection method, i.e., a change in the force or load to be measured gives rise to a change in the sensor signal, the deflection of which is processed further.

DE 37 16 615 C2 discloses a weighing system operating according to the compensation method, so-called compensation scales, in which a counterforce is exerted on a movably guided load sensor using an electrodynamic drive. In this case, the position of the load sensor is detected using a capacitive sensor and the current flowing through a coil of the electrodynamic drive is controlled based on the sensor signal such that the load sensor is kept in a load-independent equilibrium position. The coil current is then a measure of the load.

Micromechanically produced sensors, such as Micro-Electro-Mechanical Systems (MEMS) sensors, have increasingly broad fields of application. WO 02/103369 A1 shows, for example, a capacitively operating MEMS acceleration sensor having two interengaging comb electrodes (i.e., capacitor plates), one of which is arranged on a rigid base body and the other of which is arranged on a carrier that is suspended in an oscillating manner from the base body.

Depending on the application and size of the force or load to be measured, the spring bodies used in force transducers or load cells have different designs and dimensions. Since only very small deformations or movements generally and only smaller deformations or movements can be linearly detected using micromechanically produced sensors on account of the small size of the latter, there is the problem of selecting suitable MEMS sensors for spring bodies of different size and design or, from the point of view of the MEMS sensors, of finding suitable locations at which they can be arranged on the spring body. In this case, production tolerances of the spring body also play a greater role than in conventional sensors. In addition, a compromise must be found between measurement range and measurement sensitivity.

SUMMARY OF THE INVENTION

It is therefore an object of the invention to improve the adaptation of a sensor to a spring body in a force transducer or a load cell.

This and other objects and advantages are achieved in accordance with the invention by providing a force transducer or load cell in which one of the sensor parts is attached to the spring body with the interposition of an electromechanical actuator, and by providing a control device that controls the actuator based on the sensor signal in the direction of a reduction in the position difference between the sensor parts.

The compensation method known from weighing technology is therefore applied to the sensor arranged on the spring body of the force transducer or load cell. In contrast, similarly to the case of a load cell operating according to the deflection method, the spring body itself is deformed based on the load. The change in the relative position of the sensor parts, which results from the deformation, is at least partially compensated for using the electromechanical actuator, with the result that only very small movements must be detected by the sensor. Therefore, the sensor operates independently of the load and/or the deformation of the spring body in the linear range, thus also resulting in no overloading of the sensor. If the change in the relative position of the sensor parts is completely compensated for, the control signal generated by the control device for the purpose of controlling the actuator constitutes a direct measure of the load to be measured. For the rest, the control signal and the sensor signal may be combined to form the desired measurement signal.

In principle, all contactless displacement sensors or distance sensors that operate according to one of the following measuring methods come into consideration as the sensor: capacitive, inductive (for example, inductive, magnetostrictive or eddy current displacement sensor), optical (for example, propagation time method, triangulation, interferometry, image sensor technology), acoustic (for example, propagation time method) or electromagnetic. A capacitive sensor that has two interengaging comb electrodes and can be micromechanically produced in a comparatively simple and cost-effective manner is particularly suitable.

In order to compensate for the change in the relative position of the sensor parts, all electromechanical actuators operating according to the following operating principles come into consideration, in principle: piezoelectric, electromagnetic, electrostatic, electrostrictive, magnetostrictive.

In order to avoid having to individually attach the sensor parts to the spring body and adjust these individual parts, the sensor parts are preferably held on a flexible carrier, such as a film, and, with the flexible carrier, are fitted to the spring body. The sensor then consists of the sensor parts that are connected to one another via the film. In this case, the flexible carrier is particularly advantageously part of a flexible sleeve that accommodates the sensor and protects the sensor from environmental influences from the environment of the place of use of the force transducer or load cell.

One sensor part may be held on the fixable carrier with the interposition of the electromechanical actuator, with the result that the sensor forms a structural unit with the sensor parts connected to one another via the film and with the actuator. If a sleeve is provided, the actuator may be arranged, together with the sensor parts, inside the sleeve. This is the case, in particular, when one sensor part and the associated actuator are produced in one piece, which is possible, for example, in the case of a capacitive sensor having an electrostatically operating actuator. If, in contrast, the actuator is arranged outside the sleeve, the compensation for the change in the relative position of the sensor parts resulting from the deformation via the actuator also has an effect on the sleeve on which there is then only a minimal mechanical stress.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In order to further explain the invention, reference is made below to the figures of the drawing, in which.

DETAILED DESCRIPTION OF THE PREFERRED EMBODIMENTS

Figure 1:
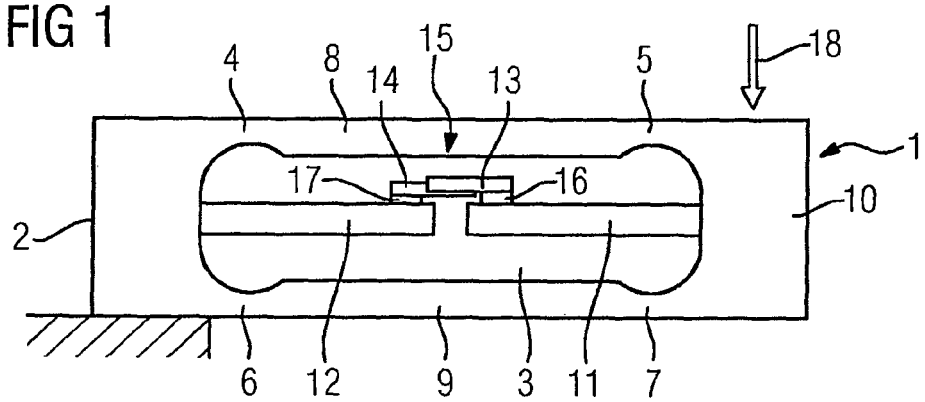
FIG. 1 shows a first exemplary embodiment of a load cell in accordance with the invention including a spring body, sensor and electromechanical actuator.

FIG. 1 shows a load cell with a spring body 1 in the form of a metal double bending bar that is fixedly mounted at one end 2 and contains a recess 3 in the center of the bar. Regions that have a reduced material cross section and form four bending points 4, 5, 6 and 7 of the double bending bar are provided on the top side and underside of the recess 3. The material webs remaining between the bending points 4 and 5 and 6 and 7 form an upper connecting rod 8 and a lower connecting rod 9 that both extend parallel to one another. Within the recess 3, two rigid bars 11 and 12 extend toward one another starting from the two ends 2 and 10 of the spring body 1, and end at a distance from one another. One of two separate sensor parts 13 and 14 of a sensor 15 is respectively arranged at the free end of each of the two rigid bars 11 and 12. Here, one of the two sensor parts, i.e., the sensor part 13, is fitted to the end of the relevant rigid bar 11 with the interposition of an electromechanical actuator 16, while the other sensor part 14 is held on the free end of the bar 12 directly or with the interposition of a fixed spacer 17.

Figure 2:
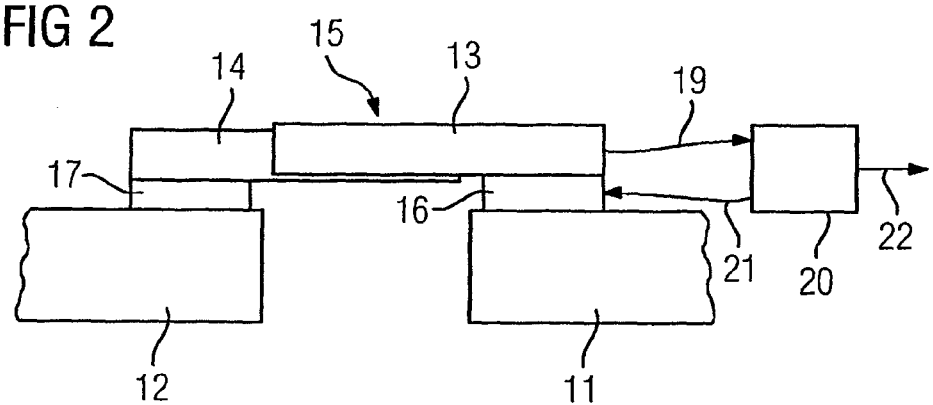
FIG. 2 shows a partial view of the unloaded load cell of FIG. 1 in the region of the sensor and actuator.
Figure 3:
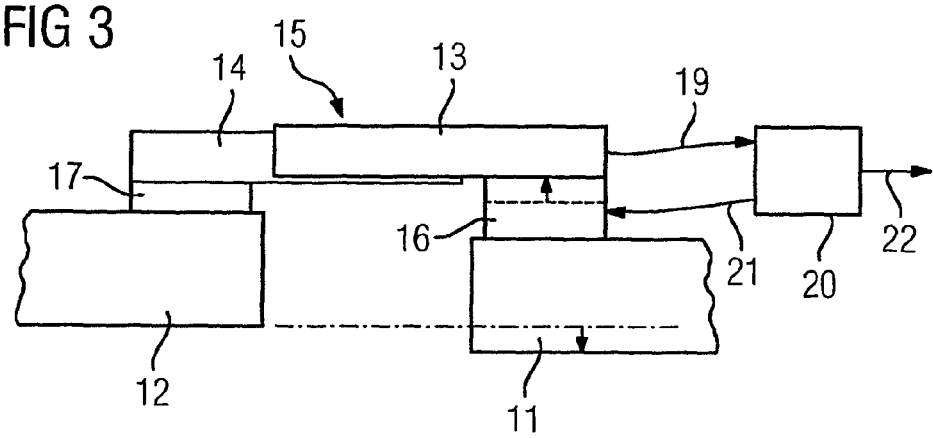
FIG. 3 shows a partial view of the loaded load cell of FIG. 1 in the region of the sensor and actuator.

As shown in FIG. 1 and in an enlarged partial view in FIG. 2, both bars 11 and 12 are aligned with one another when the spring body 1 is unloaded while, as shown in FIG. 3, the spring body 1 sags downward when a weight force 18 is applied to the free end 10 of the double bending bar, where the free end 10 is deflected downward together with the rigid bar 11 starting therefrom and the sensor part 13 held thereon. The sensor 15 generates a sensor signal 19 that is dependent on the position of the sensor parts 13 and 14 relative to one another. The sensor signal 19 is supplied to a control device 20 that then controls the electromechanical actuator 16 based on the sensor signal 19 in the direction of a reduction in the position difference between the two sensor parts 13 and 14 (control signal 21). The two sensor parts 13 and 14 therefore move only in a very small range relative to one another, with the result that the sensor 15 always operates in a linear measurement range independently of the size of the load 18 and overloading of the sensor 15 is excluded. The control signal 21 forms, alone or together with the sensor signal 19, a measure 22 of the load 18 to be measured and is accordingly evaluated in the control device 20.

The sensor parts 13 and 14 may be attached at any location of the spring body 1 at which load-dependent deformation of the spring body 1 takes place: Based on the exemplary embodiment depicted in FIG. 1, they may therefore be arranged on the undersides of the rigid bars 11 and 12. One of the bars 11 and may be respectively shortened and the other may be accordingly lengthened. The spring body may have any suitable design, such as a single bar, a double bar or multiple bar, a shear beam, an S beam, a ring torsion spring, a load cell, or a diaphragm spring body. For the sensor 15 and actuator 16, all types that are suitable for detecting or generating small displacement or rotational movements come into consideration. In the exemplary embodiment shown in FIGS. 1 to 3, a capacitive sensor 15, for example, is provided and is explained in more detail below using FIGS. 6 and 7; the actuator 16 shown operates in a piezoelectric manner, for example.

Figure 4:
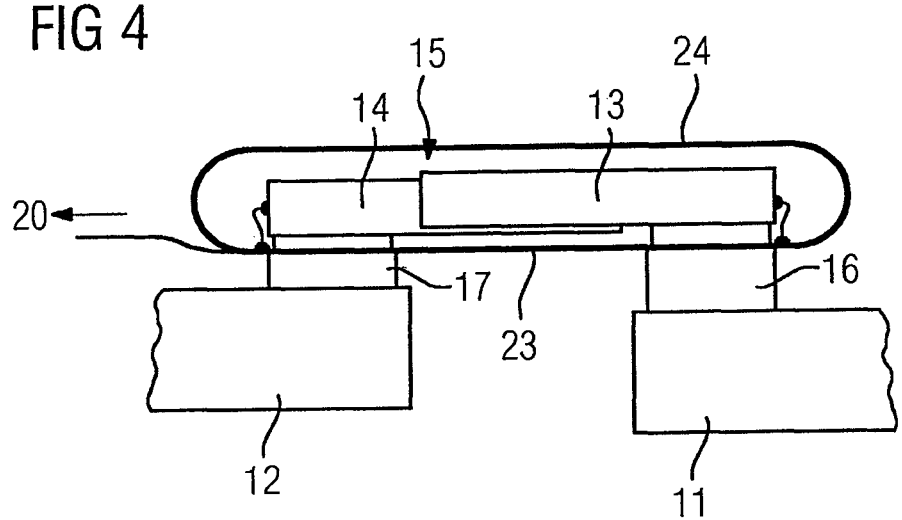
FIG. 4 shows a partial view of the load cell of FIG. 1 with a sleeve which encloses the sensor.

FIG. 4 shows an exemplary embodiment in which the two sensor parts 13 and 14 are applied to a flexible carrier 23. The flexible carrier 23, such as a film circuit board, is then also used to electrically contact-connect and connect the two sensor parts 13 and 14 to the control device 20. In the exemplary embodiment shown, the flexible carrier 23 is part of a flexible sleeve 24 which accommodates the sensor 15 and protects it from environmental influences. On account of the movement-compensating function of the actuator 16, the flexible sleeve 24 is only slightly bent, i.e., mechanically stressed.

Figure 5:
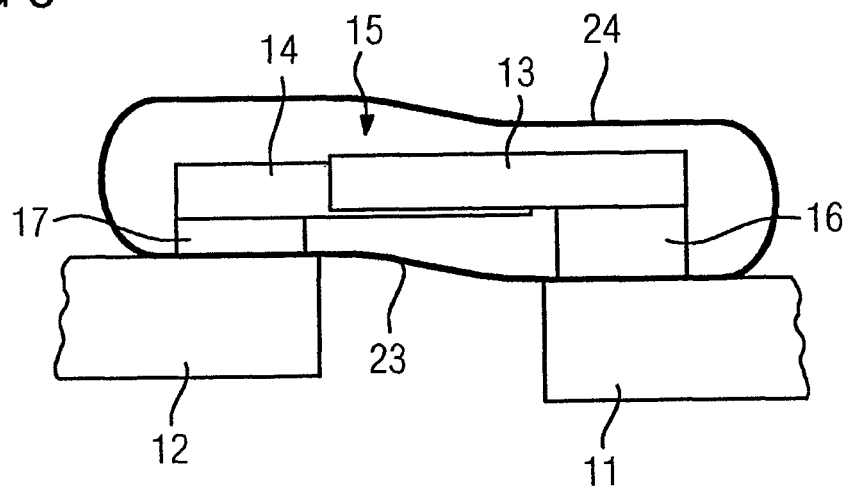
FIG. 5 shows a partial view of the load cell of FIG. 1 with a sleeve which encloses the sensor and actuator.

The exemplary embodiment shown in FIG. 5 differs from that of FIG. 4 in that the electromechanical actuator 16 is also arranged on the flexible carrier 23 and in the sleeve 24.

Figure 6:
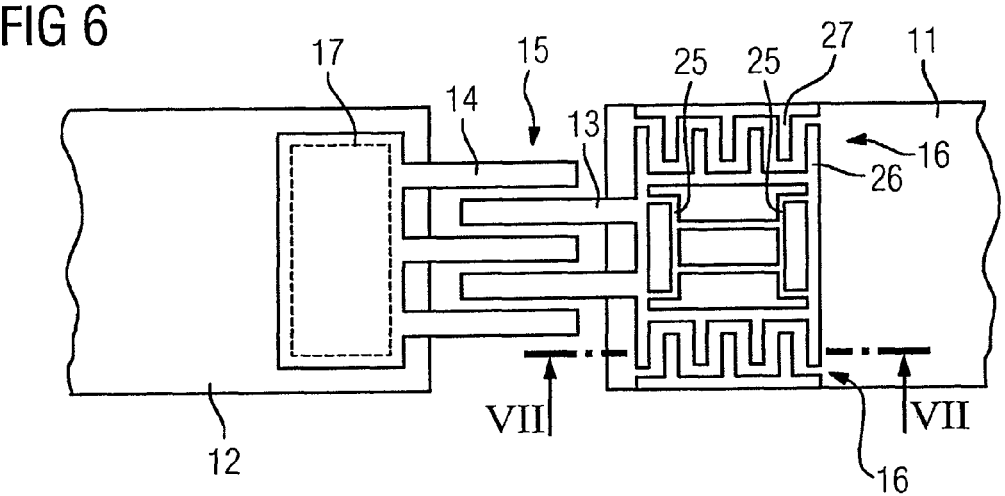
FIG. 6 shows a plan view of a further exemplary embodiment of the load cell in accordance with the invention in the region of the sensor and actuator.
Figure 7:
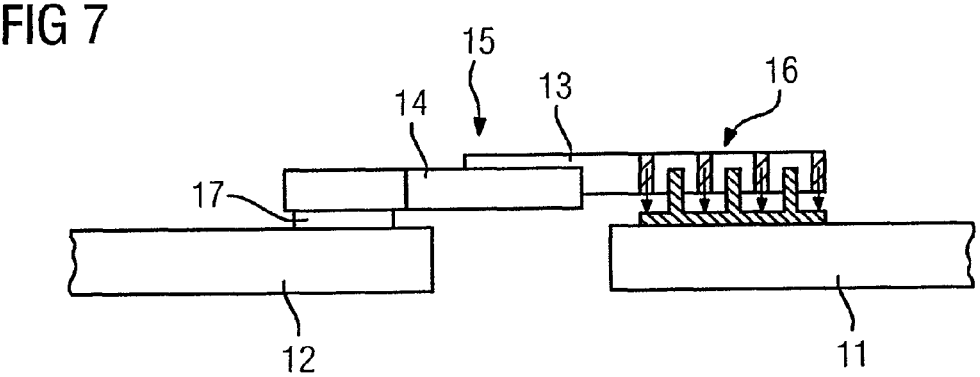
FIG. 7 shows a side view of the exemplary embodiment of FIG. 6.

FIGS. 6 and 7 show a further exemplary embodiment of the load cell in accordance with the invention in the form of a plan view and a side view in the region of the sensor 15 and actuator 16. The capacitive sensor 15 has two interengaging comb electrodes as the sensor parts 13 and 14. In practice, the comb electrodes each have a multiplicity of electrode fingers, in which case only a few comb fingers, i.e., two or three comb fingers, are shown here for the sake of simplicity. The actuator 16 is in the form of an electrostatically operating lifting mechanism. The sensor part 13 is held on the bar 11 via a spring suspension device 25 and is provided with electrode combs 26 that engage in stationary electrode combs 27 on the bar 11.

When an electrical potential is applied to the electrode combs 26 and 27, the sensor part 13 is lifted upward and counter to the force of the spring suspension device 25.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A force transducer, comprising:
a spring body which deforms under action of a force or load to be measured, and
a sensor comprising a plurality of separate sensor parts attached at different locations of the spring body and, the sensor generating a sensor signal which is dependent on a position of each of the plurality of separate sensor parts relative to one another;
an interposed electromechanical sensor actuator, one sensor of the plurality of separate sensor parts being attached to the spring body via the interposed electromechanical actuator; and
a control device which controls the actuator based on the sensor signal in a direction of a reduction in a positional difference between each of the plurality of separate sensor parts.

2. The force transducer as claimed in claim 1, wherein the sensor is configured to operate in accordance with one of a capacitive, an inductive, an optical, an acoustic and electromagnetic contactless measuring method.

3. The force transducer as claimed in claim 2, wherein the sensor comprises a capacitive sensor, and the plurality of separate sensor parts consist of two inter-engaging comb electrodes.

4. The force transducer as claimed in claim 1, wherein the electromechanical actuator is configured to operate in accordance with one of a piezoelectric, an electromagnetic, an electrostatic, an electrostrictive and amagnetostrictive method.

5. The force transducer as claimed in claim 2, wherein the electromechanical actuator is configured to operate in accordance with one of a piezoelectric, an electromagnetic, an electrostatic, an electrostrictive and amagnetostrictive method.

6. The force transducer as claimed in claim 3, wherein the electromechanical actuator is configured to operate in accordance with one of a piezoelectric, an electromagnetic, an electrostatic, an electrostrictive and amagnetostrictive method.

7. The force transducer as claimed in claim 1, wherein the plurality of separate sensor parts are held on a flexible carrier, the plurality of separate sensor parts being attached to the spring body via the flexible carrier.

8. The force transducer as claimed in claim 7, wherein the flexible carrier forms part of a flexible sleeve which accommodates the sensor.

9. The force transducer as claimed in claim 7, wherein one sensor part of the plurality of separate sensor parts is held on the flexible carrier with the interposed electromechanical actuator.

10. The force transducer as claimed in claim 1, wherein the force transducer is a load cell.

* * * * *